(12) United States Patent
de Kleer

(10) Patent No.: US 9,563,525 B2
(45) Date of Patent: Feb. 7, 2017

(54) MINIMUM CARDINALITY CANDIDATE GENERATION

(75) Inventor: Johan de Kleer, Los Altos, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 781 days.

(21) Appl. No.: 12/781,269

(22) Filed: May 17, 2010

(65) Prior Publication Data

US 2010/0306156 A1 Dec. 2, 2010

Related U.S. Application Data

(60) Provisional application No. 61/183,424, filed on Jun. 2, 2009.

(51) Int. Cl.
| | | |
|---|---|---|
| *G06F 17/00* | (2006.01) | |
| *G06N 5/02* | (2006.01) | |
| *G06F 11/22* | (2006.01) | |
| *G06N 5/00* | (2006.01) | |

(52) U.S. Cl.
CPC ........... *G06F 11/2257* (2013.01); *G06N 5/003* (2013.01); *G06N 5/025* (2013.01)

(58) Field of Classification Search
USPC ........................................................ 706/48
See application file for complete search history.

(56) References Cited

U.S. PATENT DOCUMENTS

| | | | |
|---|---|---|---|
| 2002/0188582 A1* | 12/2002 | Jannarone et al. | 706/26 |
| 2007/0299648 A1* | 12/2007 | Levitt et al. | 703/22 |
| 2008/0294578 A1 | 11/2008 | de Kleer | |

OTHER PUBLICATIONS

Kleer, Johan and BRian C. Williams. Diagnosing Multiple Faults Artifciial Inteliigence Elsvier Science Publishers 1987.*
Kleer, Johan "A Hybrid Truth Maintenance System." Xerox Palo Alto Research Center Dec. 1994.*
Siddiqi, Sajjad and Jinbo Huang "Hierarchical Diagnosis of Multiple Faults" IJCAI'07 Proceedings of the 20th international joint conference on Artifical intelligence.*
Chessa, Stefano and Paolo Santi. "Operative Diagnosis of Graph-Based Systems with Multiple Faults" IEEE Transactions on Systems, Man, and Cybernetics—Part A: Systems and HUmans vol. 31, No. 2, Mar. 2001 [Online] Downloaded Aug. 16, 2012 http://ieeexplore.ieee.org/stamp/stamp.jsp?tp=&arnumber=911368&tag=1.*
Brglez et al., "Accelerated ATPG and Fault Grading via Testability Analysis", in Proc. IEEE Int., Symposium on Circuits and Systems, pp. 695-698, 1985.
De Kleer, "Focusing on Probable Diagnoses", in Proc. 9th Nat'l Conf. on Artificial Intelligence, 842-848, 1991.
De Kleer, "A Hybrid Truth Maintenance System", PARC Technical Report, 1994 [sic, 1992 in Specification].
De Kleer, "An Improved Approach for Generating Max-Fault Min-Cardinality Diagnosis", in 19th Int'l Workshop on Principles of Diagnosis, 2008, 7 pgs.

(Continued)

*Primary Examiner* — Ben Rifkin
(74) *Attorney, Agent, or Firm* — Fay Sharpe LLP

(57) ABSTRACT

This NGDE algorithm incorporates a minimum cardinality candidate diagnosis generator which exploits conflict set reduction rules to dramatically reduce the search space and thus reduce the computational resources required to find minimum cardinality diagnoses.

23 Claims, 13 Drawing Sheets

(56) References Cited

OTHER PUBLICATIONS

Siddiqi & Huang, "Hierarchical Diagnosis of Multiple Faults", Proceedings of 20th Int'l Joint Conference on Artificial Intelligence (IJCA012007) 581-586, 2007.
De Kleer et al., "Diagnosing Multiple Faults", Artificial Intelligence, 32(1):97-130, 1987.
De Kleer et al., "Characterizing Diagnoses and Systems", Artificial Intelligence, 55 (2-3); 1992, pp. 197-222.
De Kleer et al., "Diagnosis With Behavioral Modes", in Proceedings 11th IJCAI, 1989, pp. 1324-1330.
Bailey, James, et al., "Discovery of Minimal Unsatisfiable Subsets of Constraints Using Hitting Set Dualization", NICTA Victoria Laboratory, The University of Melbourne, Australia.
Xu, Youjun, et al., "Solving SAT Problem with Boolean Algebra", 2010 Fifth International Conference on Frontier of Computer Science and Technology, IEEE, 2010, pp. 271-275.

\* cited by examiner

MINIMUM CARDINALITY CANDIDATE GENERATION

INCORPORATION BY REFERENCE

This is a non-provisional application claiming priority to U.S. Ser. No. 61/183,424, filed Jun. 2, 2009, entitled "MINIMUM CARDINALITY CANDIDATE GENERATION", by Johan de Kleer, the disclosure of which is hereby incorporated by reference in its entirety.

BACKGROUND

Model-based diagnosis (MBD) involves model-based testing in which test cases are derived in whole or in part from a model that describes some, usually functional, aspects of the system under test. The model is usually an abstract, partial representation of the system under test-desired behavior. The test cases derived from this model are functional tests on the same level of abstraction as the model. Also, model-based diagnosis is diagnostic and system-directed. Particularly, it starts with the observed misbehavior and works back toward the underlying components that may be broken.

Model-based diagnosis may be employed in a variety of arenas, including detecting faulty system behavior, identifying faulty components, repairing of the system, and reconfiguring of the system. Other areas to which MBD may be applied, include debugging cognitive models, designing experiments to build improved models of gene pathways, troubleshooting power grids, troubleshooting manufacturing lines, identifying faults in spacecraft, airplanes, and debugging programs, among other uses.

The present application is therefore related to a diagnostic system and method for diagnosing a model of a real world system, and more particularly to such a diagnostic system and method which will minimize the number of component replacements needed to restore correct functioning of the system.

BRIEF DESCRIPTION

This NGDE algorithm incorporates a minimum cardinality candidate diagnosis generator which exploits conflict set reduction rules to dramatically reduce the search space and thus reduce the computational resources required to find minimum cardinality diagnosis.

DETAILED DESCRIPTION

Figure 1:
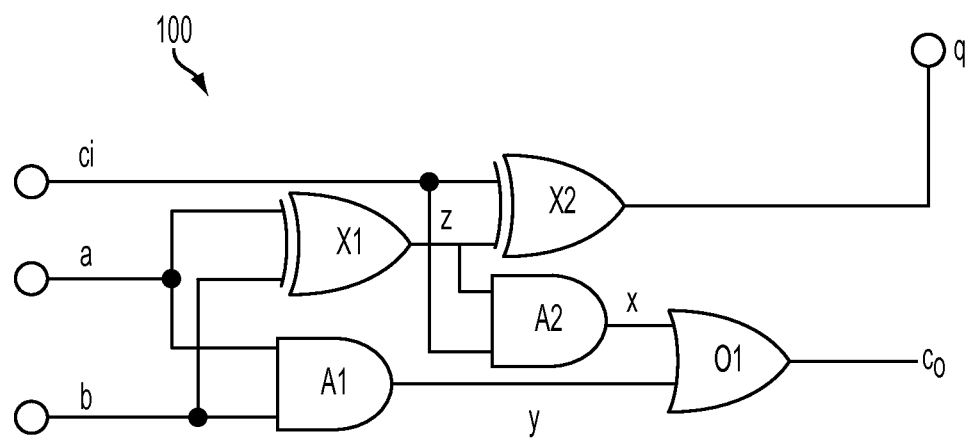
FIG. 1 illustrates a full adder.

The NGDE (New General Diagnostic Engine) system and method described in this application minimizes the expected number of component re-placements needed to restore a system's correct functioning given the computational resources available. The algorithm employed by the NDGE system and method incorporates a minimum cardinality candidate diagnosis generator which exploits conflict set reduction rules to dramatically reduce the search space and thus reduce the computational resources required to find minimum cardinality diagnoses.

The NDGE system and method described herein has been entered into the synthetic track of a diagnostic competition called the First International Diagnosis Competition (DXC). The system and method preformed best in the synthetic track of the competition and in a following rematch. The first competition consisted of 1472 scenarios of circuits taken from a 74XXX/ISCAS85 benchmark. The 74XXX/ISCAS85 benchmark is a well known set of combinational circuits, where each combinational circuit includes a network of logic gates with a number of input/output ports. In the competition diagnostic systems and methods were required to report their best estimate of their diagnoses within 20 seconds of CPU time. The scenarios included extremely large challenges consisting of up to 20 simultaneous component failures in a system of 3512 components.

The metric used in the competition ($M_{utl}$) was inversely proportional to the expected number of component replacements needed to restore a system to correct functioning. The resulting score was designed to lie between 1.0 (best) and 0.0 (worst).

The NGDE algorithm of the present application has similarities to traditional model diagnostic algorithms with additional innovations including that it: (i) focuses on obtaining the minimum cardinality (minc) diagnoses (which are the diagnoses with the minimal number of components which would need to be changed/fixed to obtain proper operation of the system under investigation), and (ii) introduces a step between discovering conflicts and searching for new diagnoses which transforms the conflict set into a much simpler conflict set. As a result, the algorithm of the present system and method can generate far more diagnoses than other existing diagnostic systems and methods which is a key to optimizing $M_{utl}$.

GDE Paradigm

The NGDE algorithm adopts the general framework of a known general diagnostic engine (GDE), such as described in de Kleer & Williams 1987, Diagnosing multiple faults, Artificial Intelligence 32(1):97-130 and de Kleer, Mackworth, & Reiter 1992, Characterizing diagnoses and systems, Artificial Intelligence 55(2-3); 197-222. Both of the above articles being incorporated by references in their entireties herein. We briefly summarize the key results here.

Definition 1: A system is a triple (SD, COMPS, OBS) where: SD, the system description, is a set of first-order sentences; COMPS, the system components, is a finite set of constants; OBS, a set of observations, is a set of first-order sentences.

Definition 2: Given two sets of components Cp and Cn define $\mathcal{D}$ (Cp, Cn) to be the conjunction:

$$\left[\bigwedge_{c \in Cp} AB(c)\right] \bigwedge \left[\bigwedge_{c \in Cn} \neg AB(c)\right].$$

Where AB(x) represents that the component x is ABnormal (faulted). A diagnosis is a sentence describing one possible state of the system, where this state is an assignment of the status normal or abnormal to each system component.

Definition 3: Let $\Delta \subseteq$ COMPS. A diagnosis for (SD, COMPS,OBS) is $\mathcal{D}$ ($\Delta$, COMPS-$\Delta$) such that the following is satisfiable:

$$SD \cup OBS \cup \{\mathcal{D} (\Delta, COMPS-\Delta)\}$$

For brevity sake, we represent the diagnosis $\mathcal{D}$ ($f_1$, $f_2$, ... ), Cn) by the faulty components: [$f_1$, $f_2$, ... ].

Definition 4: A diagnosis $\mathcal{D}$ ($\Delta$, COMPS-$\Delta$) is a minimal diagnosis if for no proper subset $\Delta'$ of $\Delta$ is $\mathcal{D}$ ($\Delta'$, COMPS-$\Delta'$) a diagnosis.

Definition 5: An AB-clause is a disjunction of AB-literals containing no complementary pair of AB-literals.

Definition 6: A conflict of (SD,COMPS,OBS) is an AB-clause entailed by SD$\cup$OBS.

With weak fault models all conflicts are positive. For brevity sake we describe a conflict by the set of components mentioned in the AB-literals of the clauses.

Definition 7: A minimal conflict of (SD,COMPS,OBS) is a conflict no proper sub-clause of which is a conflict of (SD,COMPS,OBS).

Theorem 1: Suppose that $\Pi$ is the set of minimal conflicts of (SD,COMPS,OBS), and that $\Delta$ is a minimal set such that, $$\Pi \cup \left\{\bigwedge_{c \in COMPS-\Delta} \neg AB(c)\right\},$$

is satisfiable. Then $\mathcal{D}$ ($\Delta$, COMPS-$\Delta$) is a minimal diagnosis.

We also assume the usual axioms for equality and arithmetic are included in SD. Note that the minimal diagnoses correspond to the minimal hitting sets of the conflicts.

Theorem 1 forms the basis of many model-based diagnosis algorithms: (1) use constraint propagation to draw inferences, (2) compute minimal conflicts, and (3) compute diagnoses from these minimal conflicts. It is easy to show that the number of minimal conflicts can grow exponentially with system size. Unfortunately, this exponential complexity growth is manifested in the ISCAS85 benchmarks (even with weak fault models). Therefore, a direct application of this approach cannot be used. The ISCAS85 benchmarks are a neutral netlist of 10 combinational benchmark circuits such as presented by Brglez & Fujiwara in a 1985 paper published in: In Proc. IEEE Int. Symposium on Circuits and Systems, 695-698.

Utility Metric

Returning to the previously mentioned utility metric: $M_{utl}$. There are many options to evaluate the results of a diagnostic algorithm. We adopt the individual diagnosis metric $0 \leq m_{utl} \leq 1$. The intuition behind this metric is to charge a diagnostic algorithm for every incorrect component replacement required to restore the circuit to functioning.

$$m_{utl}(D) = \frac{|I|}{|D| + c(|I - D|, |C - D|)},$$

where I is the set of actual faulty components, C is the set of all components, D is the evaluated diagnosis, and c(n, m) is the cost of identifying the n faulty components of m remaining components through individually testing each component. If n is much smaller than m then:

$$c(n, m) \approx \frac{nm}{n+1}.$$

If the reported diagnosis is correct, then I=D and $m_{utl}$=1. Consider a single fault in a system of 10 components and the single diagnosis in which all components are good. In this case $m_{utl}$=0.2 because on average it will take 5 samples to identify the one faulted component out of 10. Consider the case where a diagnostic algorithm reports {A, B} are faulted, when the actual fault is {B, C}. B was correctly replaced, A was replaced needlessly and identifying the faulty component out of 8 components requires on average 4 tests:

$$m_{utl}(D) = \frac{2}{2 + c(1, 8)} = 0.333$$

Typically, a diagnostic algorithm produces a set of candidate diagnoses so we compute the average score over all diagnoses: $\mathcal{D}$ :

$$M_{utl}(\mathcal{D}) = \frac{\sum_{D \in \mathcal{D}} p(d) m_{utl}(D)}{|\mathcal{D}|},$$

where p(d) is the probability the algorithm assigns to diagnosis d. This metric is used by the competition to evaluate diagnosis algorithms.

Sherlock/HTMS Approach

A way to dramatically improve diagnostic performance of a GDE system and method is by employing a Hybrid Truth Maintenance System [HTMS]. The above use of the HTMS with GDE has been described in de Kleer 1991, Focusing on probable diagnoses, In Proc. $9^{th}$ National Conf. on Artificial Intelligence, 842-848, and de Kleer, 1992, A hybrid truth maintenance system, PARC Technical report. Both of these documents being incorporated by reference in their entireties.

A variant of this above approach is used in the present NGDE system and method. Where the key intuition that allows the improvement is to only generate the needed conflicts.

HTMS

The present NGDE system and method uses HTMS as its fundamental reasoning paradigm. The HTMS algorithms can be understood either as an extension of a Logic Truth Maintenance System [LTMS] algorithm or of an Assumption Truth Maintenance System [ATMS] algorithm. However, it is simpler to start with the ATMS conceptualization. The HTMS algorithm can be viewed as an ATMS algorithm with five important modifications:

- The HTMS only maintains labels with respect to a specified set of contexts—each context is characterized by a focus environment (a candidate diagnosis). This avoids much of the combinatorial explosion encountered using the ATMS as irrelevant label environments lying outside of the focus environments and are not maintained.
- For every candidate diagnosis, the HTMS finds at most one label environment for each TMS node. This eliminates the combinatorial explosion where a node has an exponential number of derivations within the same context.
- The HTMS incorporates a scoring function which guides the HTMS to find the single 'best' label environment for each node in each focus. For example, the score of an environment can be the number of assumptions it contains. This scoring function is important for NGDE because smaller conflicts reduce the search space faster.
- To improve the expressive power it accepts arbitrary clauses, like the LTMS. In NGDE the HTMS is used in a complete mode: If after a context switch, any variable (ATMS class) has no believed nodes, it invokes an internal HTMS search to satisfy all the clauses. For the DXC scenarios this occurred rarely and had little impact on computational performance.
- It exploits extensive ATMS-like caching strategies so that the focus environments can be changed at relatively little cost. Changing contexts is almost always much cheaper than that of an LTMS but more expensive than that of an ATMS.

Consider the full adder 100 of FIG. 1. Suppose all inputs are set to 0. Examples of the types of inferences the HTMS draws are:

$\neg AB(A1) \rightarrow y=0,$ $\neg AB(X1) \rightarrow z=0,$ $\neg AB(A2) \rightarrow x=0,$ $\neg AB(A2) \wedge \neg AB(A1) \wedge \neg AB(O1) \rightarrow c_o=0.$ Suppose $c_o=1$. Some of the inferences the HTMS derives are:

$\neg AB(A2) \wedge \neg AB(A1) \wedge \neg AB(O1) \rightarrow \bot A$ conflict.

$\neg AB(A1) \wedge \neg AB(O1) \rightarrow x=1.$

Sherlock/HTMS Architecture

Figure 2:
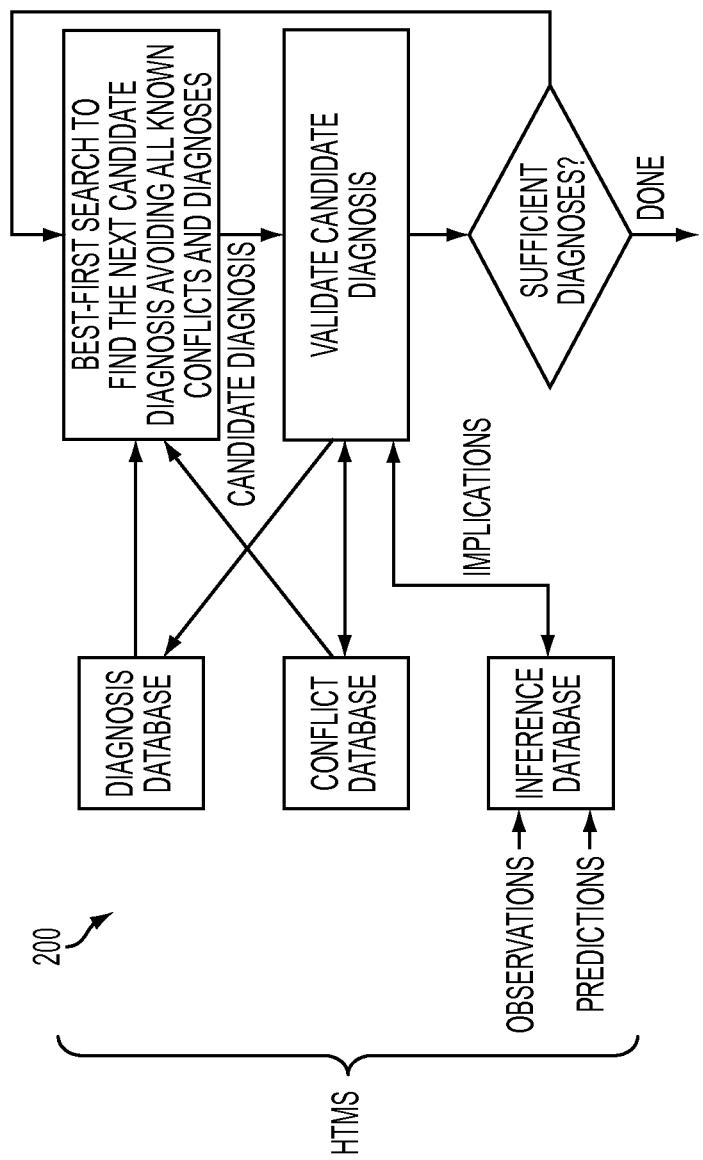
FIG. 2 illustrates a Sherlock/HTMS architecture.

NGDE exploits the focusing approach of Sherlock/HTMS (See: de Kleer & Williams, 1989 Diagnosis with behavioral modes, In Proc. 11$^{th}$ IJCAI, 1324-1330). FIG. 2 describes the Sherlock/HTMS basic architecture 200. There are 3 main databases: (1) the set of candidate diagnoses examined so far (some of which have been ruled out), (2) set of conflicts found so far (n), and (3) the set of all predictions that have been made so far. Any conflict subsumed by another conflict is removed from its database. Analogously, any prediction subsumed by another prediction is removed from its database. These removals are accomplished with the HTMS. It is important to note that π typically does not necessarily contain all or for that matter any of the minimal conflicts of the system. Enforcing minimality or completeness is exorbitantly costly. Therefore it would be useful to minimize the number of unnecessary conflicts discovered in the process of finding the minimal diagnoses.

This issue of unnecessary conflicts may be seen by reviewing the NDGE operations undertaken using the Sherlock/HTMS system of FIG. 2. At the start all databases are empty and observations are added to the inference database. A best-first search proceeds to find the next candidate diagnosis which avoids all known conflicts. Initially, there are no conflicts, so the first candidate diagnosis found is [ ] (i.e., an empty set). Next, NGDE determines any new prediction(s) that follow from that candidate diagnosis. If the candidate diagnosis is consistent with the observations, it is added to the diagnosis database. Otherwise, a new conflict(s) must have been discovered and this new conflict(s) is/are merged with the current conflict database. If sufficient diagnoses have been found, the search terminates. Otherwise, the search continues for new novel candidate diagnoses.

As mentioned in certain situations drawbacks may exist with the use of the system and method of FIG. 2. For example, the best first search is not an anytime algorithm, it needs duplicate detection, and its open list design results in a fast increase in size and complexity.

Ambiguity Groups

Figure 3:
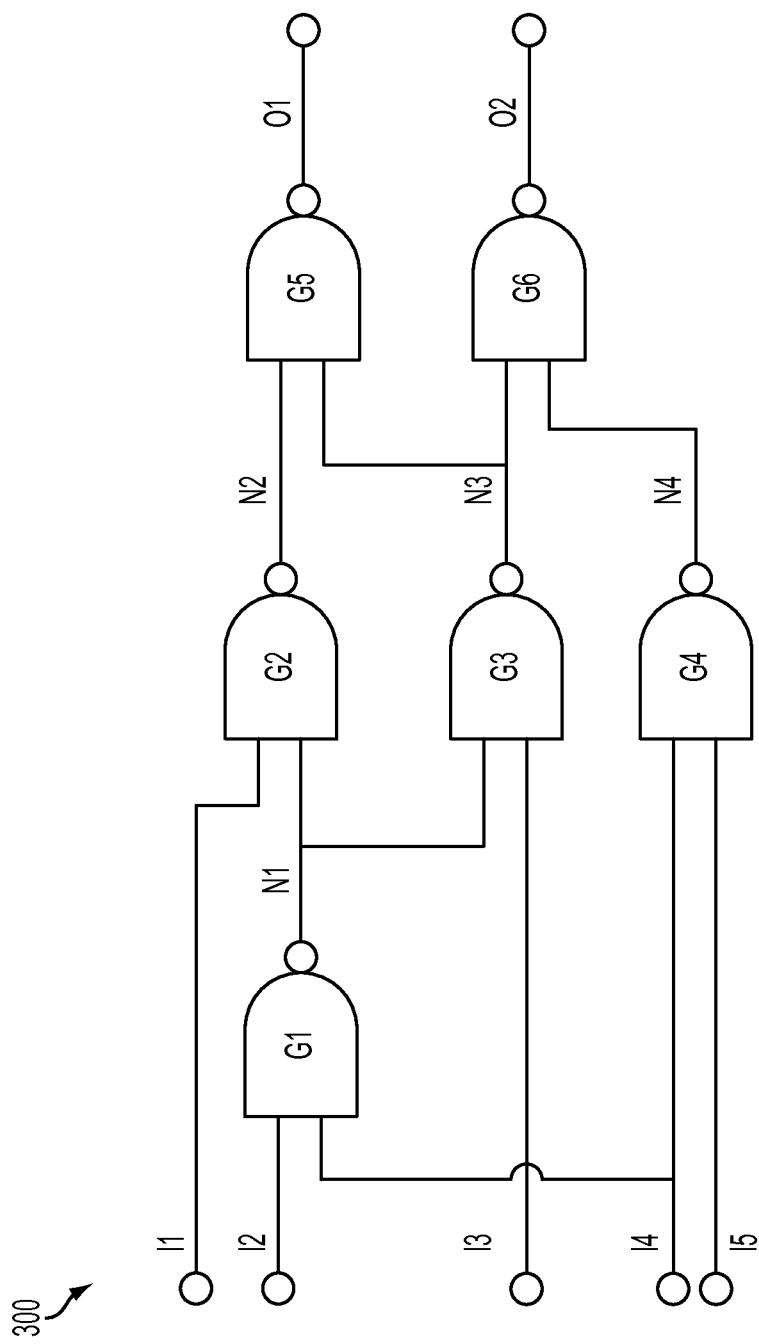
FIG. 3 shows the simplest circuit, c17, from the ISCAS-85 test suite.

Consider the simple circuit 300 of FIG. 3. A fault in G2 cannot be distinguished from a fault in G5 unless internal measurements are made or allowed. Thus, {{G2}{G5}} is an ambiguity group of size 2. Ambiguity groups can be very large. Fault collapsing (such as described in de Kleer 2008, An improved approach for generating max-fault min-cardinality diagnosis, In 19$^{th}$ International Workshop on Principles of Diagnosis) or, equivalently cone reduction (such as described in Siddiqi & Huang 2007 Hierarchical diagnosis of multiple faults, Proceedings of the 20$^{th}$ International Joint Conference on Artificial Intelligence (IJCAOI2007) 581-586) can reduce the size of the circuit.

The present NGDE system and method has been developed to employ a more general approach which achieves all the results of these above techniques far more efficiently and can seamlessly integrate the results of internal measurements. In particular the NGDE system and method identifies as much of the minc ambiguity as it can within the resource constraints it is given.

Figure 4:
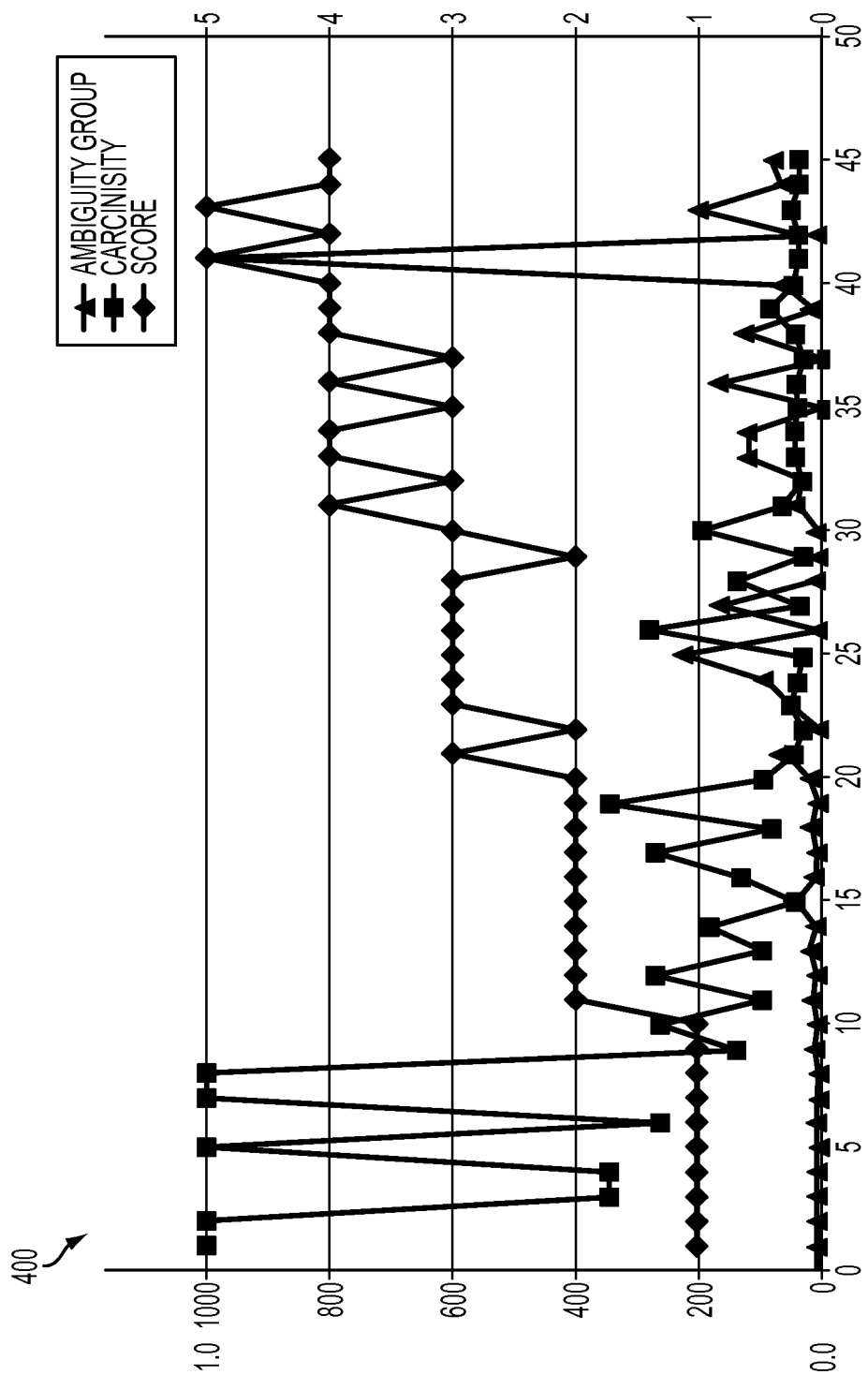
FIG. 4 show the results for benchmark circuit c432.

If the full ambiguity group (e.g., all the diagnoses of a system (e.g., circuit) that cannot be uniquely distinguished) could be obtained, then returning that set provides the maximum expected $M_{utl}$. The graph 400 of FIG. 4 plots ambiguity group size, minimum cardinality diagnosis size and $M_{utl}$ for 45 scenarios of the c432 portion of the 74XXX/ISCAS85 benchmark of circuits. It is to be noticed that as cardinality rises so does ambiguity group size, but not smoothly. Notice that $M_{utl}$ varies roughly inversely with ambiguity group size, which is what we would expect.

NGDE's Candidate Search

Figure 5:
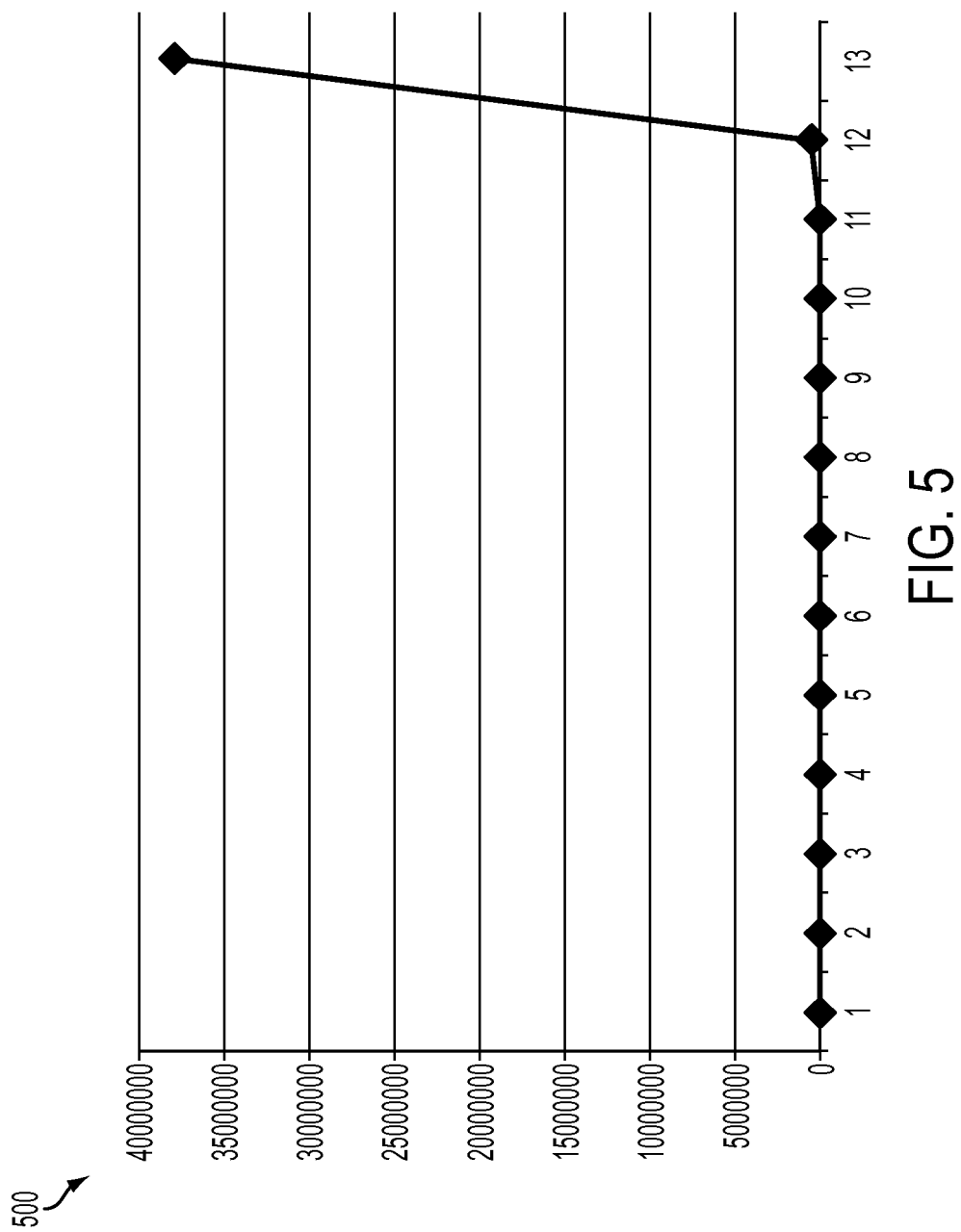
FIG. 5 depicts a graph for the benchmark circuit c5315.223, which shows how the number of minimal diagnoses grows with cardinality, which represents a very large ambiguity group.

The best-first search component of the architecture of FIG. 2 performs poorly when there are only high-cardinality diagnoses. The root cause is that the open list in the best-first search grows extremely quickly. Graph 500 of FIG. 5 illustrates how quickly the number of minimal diagnoses can grow (and the open list grows faster than the number of minimal diagnoses). Hence, NGDE of the present application uses a depth-first branch and bound search. A side benefit of depth-first search is that it can find a single diagnosis quickly. It is mentioned here that a breadth-first search (combined with the ATMS) is also an anytime algorithm, but it finds a first diagnosis much later than the depth-first search.

Thus the features of a depth-first search improves performance significantly on the larger scenarios (e.g., when diagnosing large circuits and or circuits with a large number of faults). Therefore the NGDE system and method of the present application uses depth-first search to identify a minimum cardinality diagnosis. Fortunately, there are some known limits on minimum cardinality which can avoid the search becoming too deep. The minimum cardinality is bounded above by: (1) number of outputs of the system, (2) number of minimal conflicts, and (3) number of components involved in the minimal conflicts.

Transformations of the Conflict Set

One shortcoming of previous candidate generators is that they cannot find minimum-cardinality diagnoses efficiently when their cardinality is high. In order to improve the performance of candidate generation we defined the notion of conflict graph which is defined as:

Definition 8: A conflict graph G is a bipartite graph (C∪A, E), where C is a set of conflicts, A is a set of propositional symbols, and an edge (c, a)∈E if literal a∈A occurs in clause c∈C.

Figure 6:
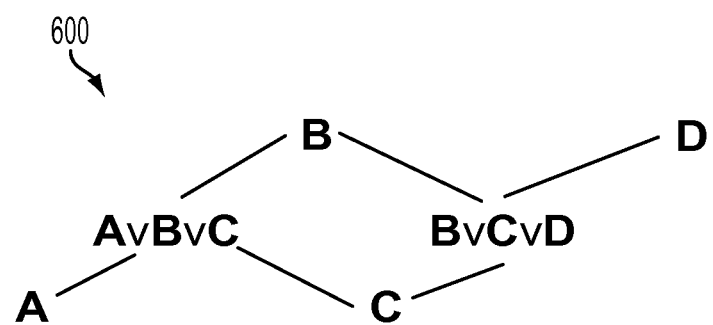
FIG. 6 illustrates a conflict graph for two conflicts A ∨ B ∨ C, and B ∨ C ∨ D.

FIG. 6 illustrates a conflict graph 600 for two conflicts.

There are two techniques used to rein in the complexity of the candidate generator. The first, essentially trivial, is to do a connected component (graphical components) analysis of the conflict graph to factor the conflicts. The second is to reduce both the number of conflicts, their sizes and the involved variables yet preserving the ability to determine minc diagnoses.

Before describing the NGDE algorithm more formally, consider the following example. Suppose there are only two conflicts: {A, B, C}, {A, B, R}. As A and B co-occur in every conflict, every diagnosis containing A will have a corresponding diagnosis with A replaced by B. Thus these two conflicts can be rewritten as 2 conflicts over 1 fewer variables: {A, C}, {A, R}. This conflict set has one minc diagnosis [A], and the other minc diagnosis for the original set can be determined by replacing B for A in each diagnosis: [B]. This conflict set has the same minc value. This approach eliminates a significant number of the variables. Thus the depth-first search has been simplified and the upper bound of minc reduced (because number of variables is an upper bound).

The number of conflicts can also be reduced as well as the number of variables. If all appearances of component x occur with component y, then x can be removed from all conflicts and the resultant set reduced with subsumption. In our example, both C and R co-occur only with A, so both C and R can be eliminated from all the conflicts. After removing subsumed conflicts, we remain with one: {A}. In this particular example, it was trivial to see that minc was 1 because of the intersection of all conflicts with the singleton {A}.

The following describes how NGDE exploits this in general. We define the conflicts in which a component appears as:

conf(A)={c∈π|A∈c}.

If conf(A)=conf(B) we say A≡B. If conf(A)⊊conf(B) we say A<B.

To transform π (i.e., the set of conflicts found so far) into a simpler set we repeatedly apply the following rewrite rules:

1. Remove subsumed conflicts.
2. Factor the set of conflicts into disconnected subgraphs.
3. If x≡y, remove x from all conflicts and note the equivalences.
4. If x<y, remove x from all conflicts.

The combination of these rules dramatically simplifies conflicts. The effect of factoring is minimal is most significant if internal measurements are permitted. r=(π) represents the reduced conflict set after applying the first 3 rules. r<(π) represents the conflicts after all the rules have been applied.

Full Algorithm

The following uses a pseudo code to summarize the full algorithm used in the NGDE system and method of the present application, in the case where the conflict has no disconnected components:

---
Algorithm 1: Full algorithm.
---

Result: DS is the set of minimum cardinality
       diagnoses.
begin
    π ← ∅
    π' ← ∅
    repeat
        minc < min(|r<(π)|, |vars(r<(π))|, |outputs|)
        D ← DFS(r<(π),minc )
        π' ← HTMS(D, π)
    until π' = π if no new conflicts are found we have found
    a minc diagnosis
    minc ← |D|
    DS ← Expand(DFSwHTMS(r⁻(π),minc
    ), Map(r=(π)))
end

---

EXPAND ($\mathcal{D}$, Map) expands the diagnoses with each of their consistent (not all of them will be) equivalents. DFS(π, m) finds one minimal cardinality diagnosis of conflicts π using branch and bound (and is bounded above by m). HTMS (D) focuses the HTMS on candidate diagnosis D and updates the conflict set. If candidate diagnosis D is inconsistent, then π will be updated. DFSwHTMS (π, q) finds all diagnoses of π of cardinality q.

Figure 7A:
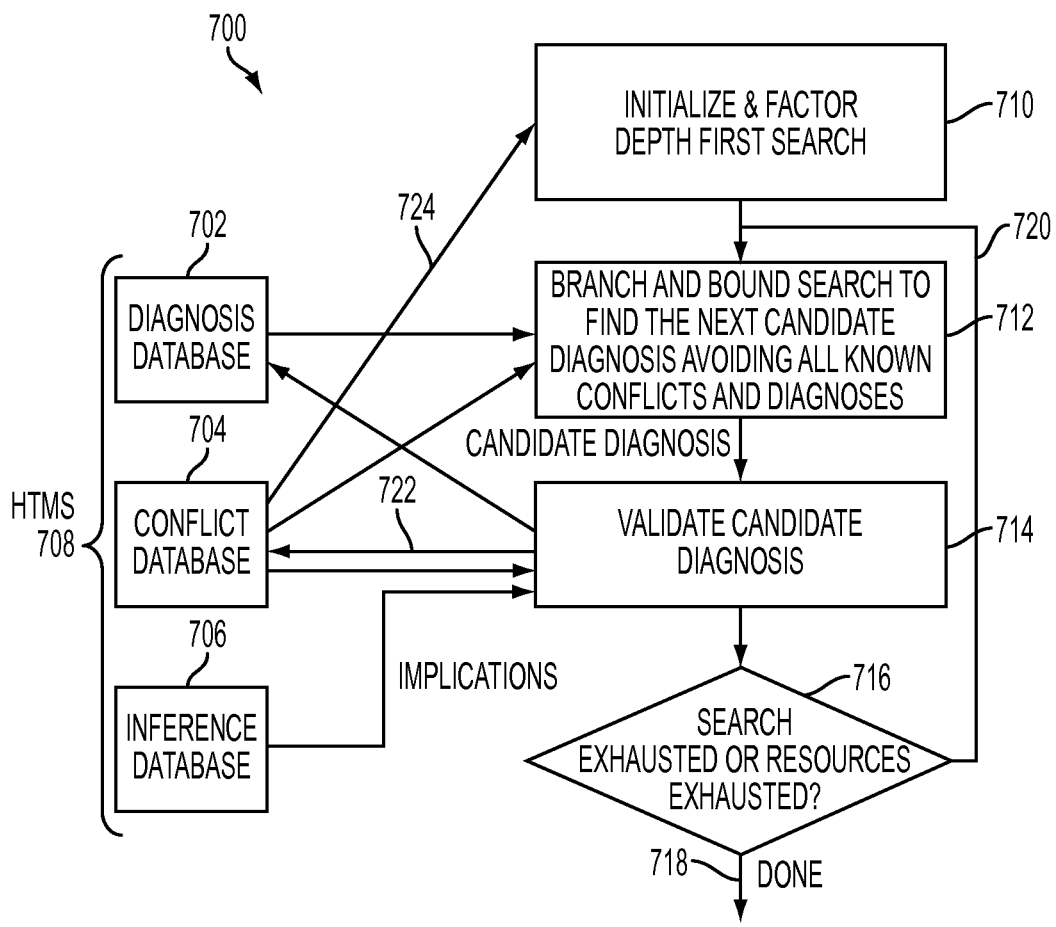
FIG. 7A depicts an iterating branch and bound search for minc.

In consideration of the foregoing discussion FIG. 7A depicts, a process flow 700 incorporating the concepts of the above described pseudo code as it interacts with diagnosis database 702, conflict database 704, inference database 706 and HTMS 708.

In an initialization operation, all conflict set transformations are applied once an upper bound on minc (from all the properties discussed earlier is computed 710). Next, using π a (bounded by minc) depth-first branch and bound search is used to find a candidate diagnosis (D) avoiding all known conflicts and diagnoses. In this search only one candidate diagnosis (D) of those found is kept, and the space is exhaustively searched to prove it is minc. (If there are disconnected subgraphs, these actions are applied to each subgraph. The minc of a set of conflicts is the sum of the mincs of its connected components, and the candidate diagnosis (D) is the conjunction of the minimum candidates of the components) (712).

Next, the HTMS is focused on candidate diagnosis (D) to validate the diagnosis (714).

If D is a proper diagnosis, the process moves to step 716 to determine if all possible minc diagnoses have been checked, and if all possible diagnoses have been checked (in view of available time or other criteria), i.e., has all searching been exhausted or have all resources been exhausted. If this is the case, the process ends and minc is determined (718). If not, the process moves back (via 720) to step 712 and the process continues.

Figure 7B:
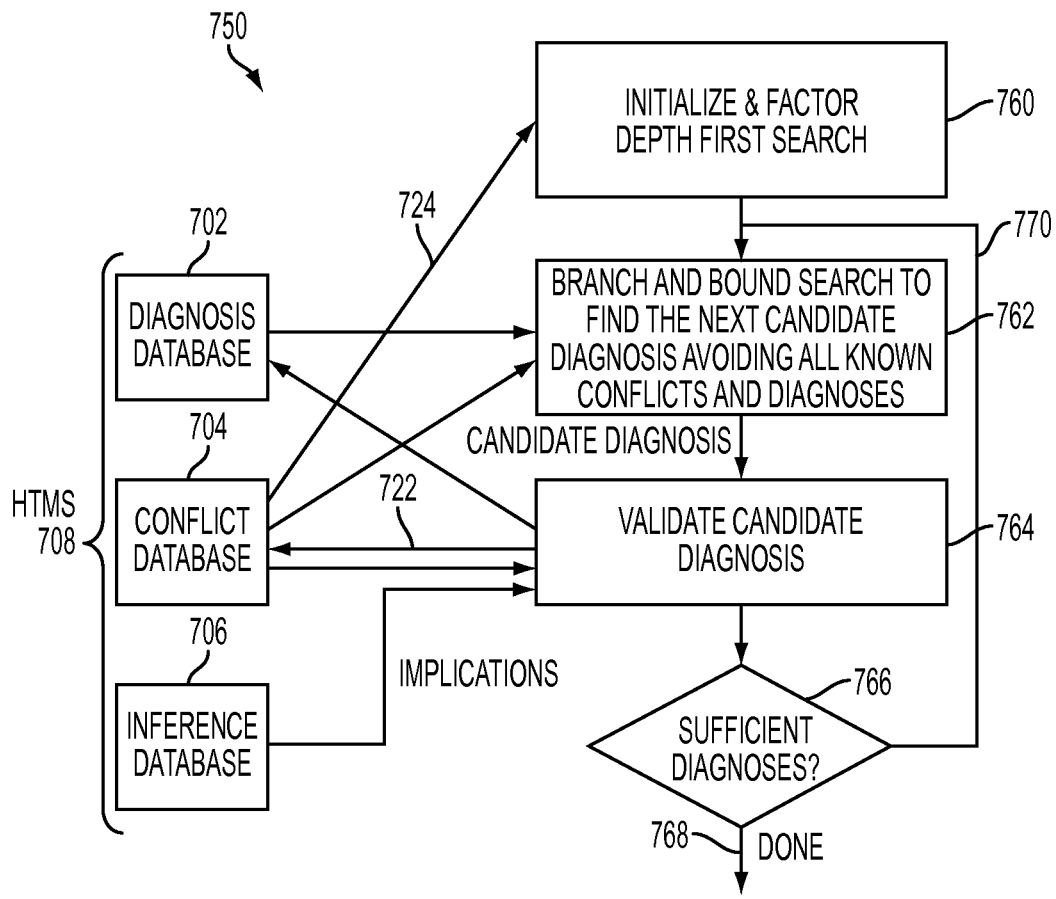
FIG. 7B depicts a depth-first search performed after minc is determined.

Once minc has been determined, a second search 750 is performed as described in FIG. 7B. This search has much the same structure as the first search. This time, however, the process checks each candidate diagnosis as it is found in an attempt to find as many elements of the ambiguity group as possible. More particularly, in an initialization step 760 the first three conflict rewrite rules, previously mentioned, are applied (i.e., 1 Remove subsumed conflicts; 2 Factor the set of conflicts into disconnected subgraphs; 3 If x≡y, remove x from all conflicts and note the equivalences). Next, a depth-first search (762) is used to find a candidate diagnosis (D) avoiding all known conflicts and diagnoses. Different from the search of FIG. 7A (i.e., where only one candidate diagnosis (D) of those found is kept), each candidate diagnosis is checked as it is found to (as mentioned above) find as many ambiguity groups as possible. This search then (similar to search 700) exhaustively searches the space to collect the members of the ambiguity group. (If there are disconnected subgraphs, these actions are applied to each subgraph and the resulting ambiguity groups are merged via a vector cross-product).

Again, similar to process 700, the HTMS is then focused on the current candidate diagnosis (D) to validate the diagnosis (764)

If the D under diagnosis is a proper diagnosis, the process moves to step 766 to determine if sufficient diagnoses have been collected or resources are exhausted, the process ends and the diagnoses of the ambiguity group are returned (718). If not the process moves back (via 770) to step 762 and the process continues.

Note, it is tempting to use the equivalences to generate more equivalent diagnoses, this is incorrect. There may be undiscovered conflicts involving components equivalent to ones in D.

Processing continues until an end of processing is reached, either as a final result is found or some other action causes the processing to end, such as an end of time period is reached.

If (at 714) D is found not to be a diagnosis, this means the HTMS must have discovered a new conflict which D fails to satisfy. So the next step is to merge (via 722) the new conflict(s) into π of conflict database (704).

Table 1 below describes the key parameters at the phases of the algorithm for benchmark 74L85.022.

|  | conflicts | variables | mean size |
| --- | --- | --- | --- |
| After minc |  |  |  |
| π | 6 | 20 | 7.5 |
| r $^<$ (π) | 5 | 5 | 2 |
| Conclusion |  |  |  |
| π | 10 | 26 | 9.6 |
| r $^=$ (π) | 10 | 14 | 5 |

At the point the minc is determined, π contains 6 conflicts with a mean size of 7.5 over 20 variables. However, this set reduces to 5 conflicts in 5 variables with an average of 2 variables per conflict. Thus the search for minc is comparatively simple. After all the minc diagnoses are identified π has grown to 10 conflicts over 26 variables with average size 9.6. π grows because new inferences need to be made when checking tentative minc candidates. In order to determine all minc diagnoses the search is over 10 conflicts over 14 variables with average size 5. Inverting the equivalences, the minc diagnosis expands into 6 of cardinality 3. Search is then started using r≡(π) alone to find the remaining 35. The most costly phase of the search is determining minc. Fortunately, this phase is most improved by reducing the conflict set (in this case to 5 conflicts of average size 2).

Table 2 below enumerates the key data for benchmark c5315.185. This circuit has 2307 components and the injected fault is of cardinality 13. This scenario has >100,000 minc diagnoses.

|  | conflicts | variables | mean size |
| --- | --- | --- | --- |
| After minc |  |  |  |
| π | 25 | 228 | 11.2 |
| r $^<$ (π) | 15 | 16 | 1.4 |
| Conclusion |  |  |  |
| π | 33 | 251 | 12.1 |
| r $^=$ (π) | 33 | 57 | 3.5 |

The following describes the behavior of the NGDE system and method when applied to the 74L85.022 combinatorial circuits (of the 74XXX/ISCAS85 benchmark circuits) in more detail. Initially, the NDGE algorithm considers the diagnosis [ ]. But immediately discovers the conflict (using the names from the DXC circuit description): {o3,z3,x9, z10,z17,z23}. Now r<(π)={{z3}} (the NDGE algorithm picks an arbitrary component from the conflict) and considers the diagnosis [z3] next. The HTMS discovers the second conflict: {o1,z7,z15,z20}. The subsumption rule (or factoring rule) immediately reduces these conflicts to r<(π)= {{z3}{z7}} and hence the next diagnosis to try is [z3,z7]. The HTMS discovers a third conflict: {o1,o3,z30}. Now r<(π)={{o1,o3,z30}{o3,z3}{o1,z7} (there are other possible reductions, NGDE just picks one). And r<(π)= {{o3}{o1}}. The next tentative diagnosis is [o1,o3]. The HTMS discovers a fourth conflict: {o2,z3,z6,z11,z18,z22, z24,z26,z28,z29}. r<(π)={{o1}{z3}}, and hence the next tentative diagnosis is [o1,z3]. The HTMS discovers a fifth conflict: {o2,z6,z7,z15,z20,z22,z24,z26,z28,z29}. r<(π)= {{o3}{o1}{z6}}, and hence the new tentative diagnosis [o1,o3,z6]. The HTMS discovers a 6th conflict: {o2,z3,z7, z11,z15,z18,z20,z22,z24,z26,z28,z29}. This is the first instance where the conflicts cannot be reduced to singletons and a depth first search is required. Now r<(π)={{o1, o3}{o3,z3}{o1,z7}{z3,z6}{z6,z7}}. The depth first search is invoked for the first time, and the next tentative diagnosis is chosen: [o1,o3,z6]. The HTMS identifies a new conflict: {o2,z3,z7,z11,z15,z18,z20,z22,z24,z26,z28,z29}.

As a result the last two reduced conflicts are replaced with {z3,z22}, {z7,z22}. The search continues until the diagnosis [o1,o3,z22] is found. The depth-search first continues and it finds no diagnosis of lower cardinality. The single minc diagnosis is expanded to 6 by its equivalences. Sometimes the single minc candidate will expand to all the minc diagnoses. In this case, a new search is invoked to find all diagnoses of cardinality exactly 3. There are 35 more such diagnoses.

Fraction of Ambiguity Group Discovered

Figure 8:
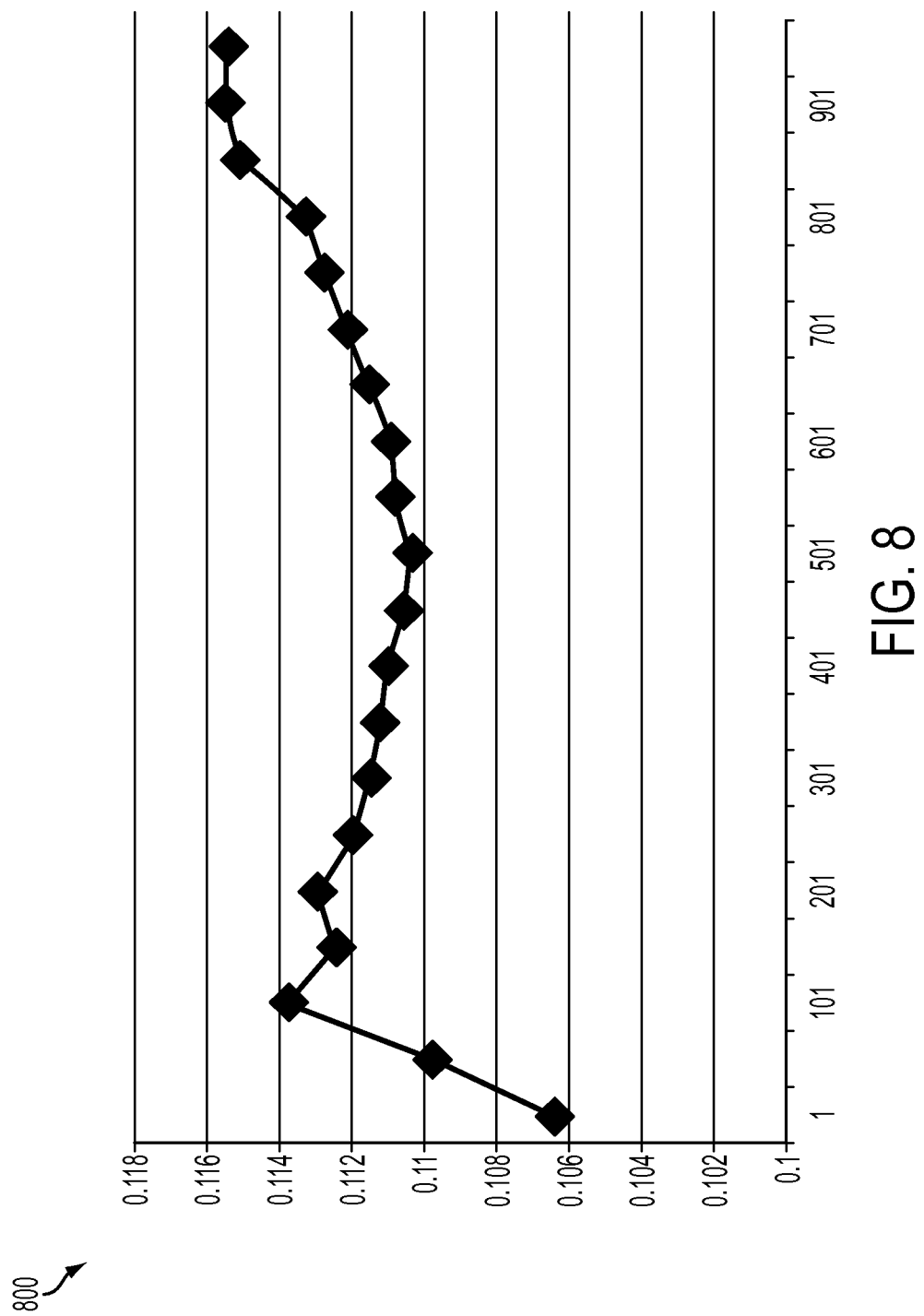
FIG. 8 is a graph showing $M_{utl}$ vs. the number of diagnoses for scenario 50 of 74181 in the order NGDE discovered them.
Figure 9:
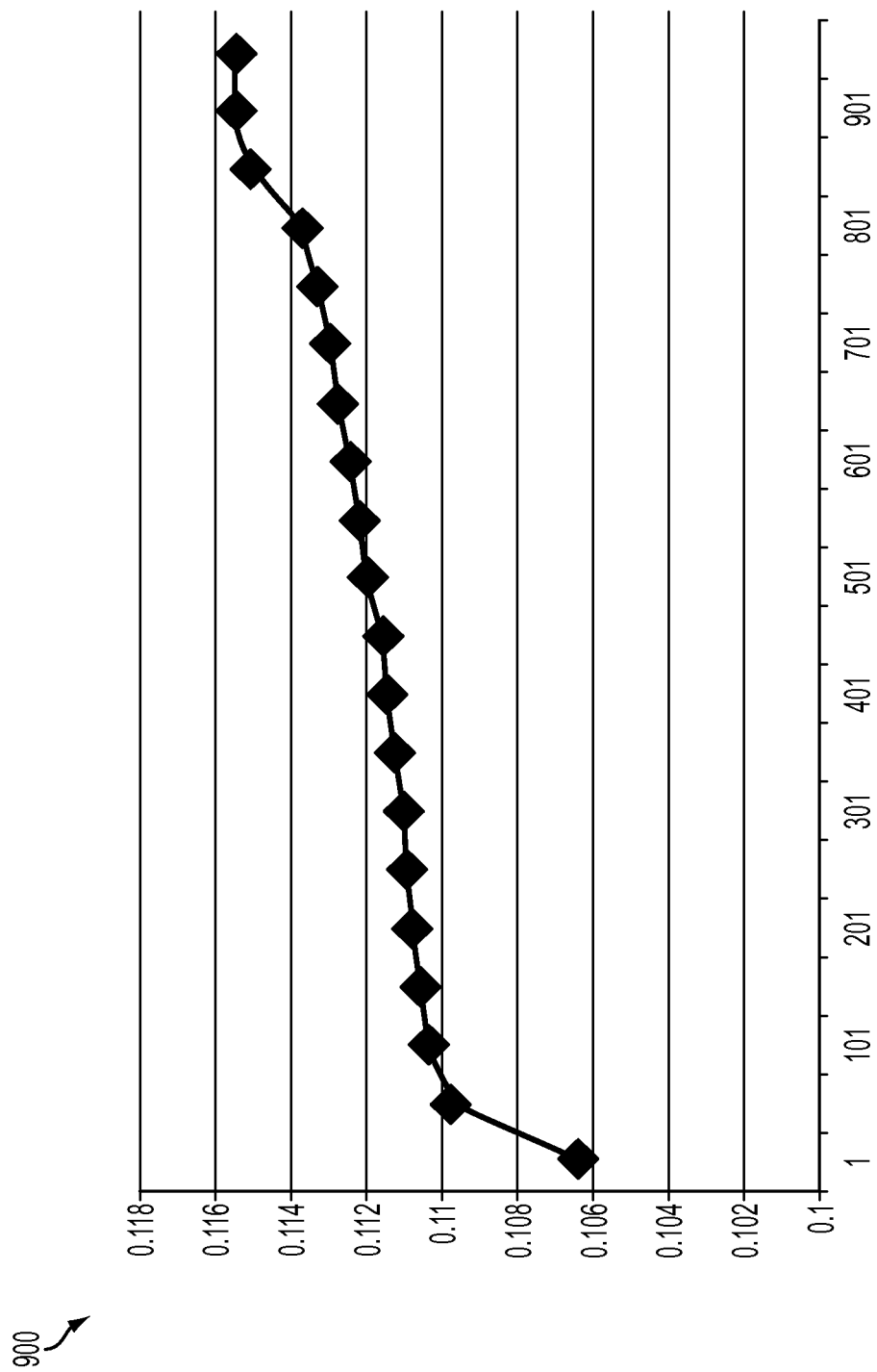
FIG. 9 is a graph showing the average curve of $M_{utl}$ vs. the number of diagnoses for scenario 50 of 74181.

Reporting as much of the ambiguity group as possible is the best strategy on average, however the improvement in $M_{util}$ quickly reaches an asymptote. Graph 800 of FIG. 8 graphs $M_{util}$ vs. number of diagnoses for scenario 50 for 74181 (of the 74XXX/ISCAS85 benchmark circuits). It shows a typical slow growth of $M_{util}$ as diagnoses are collected. $M_{util}$ on any particular run will not grow monotonically as the score will depend on the order in which ambiguity group members are encountered. Scenario 50 has an ambiguity group size of 884 of cardinality 6. Chart 900 of FIG. 9 illustrates what the average curve looks like.

Figure 10:
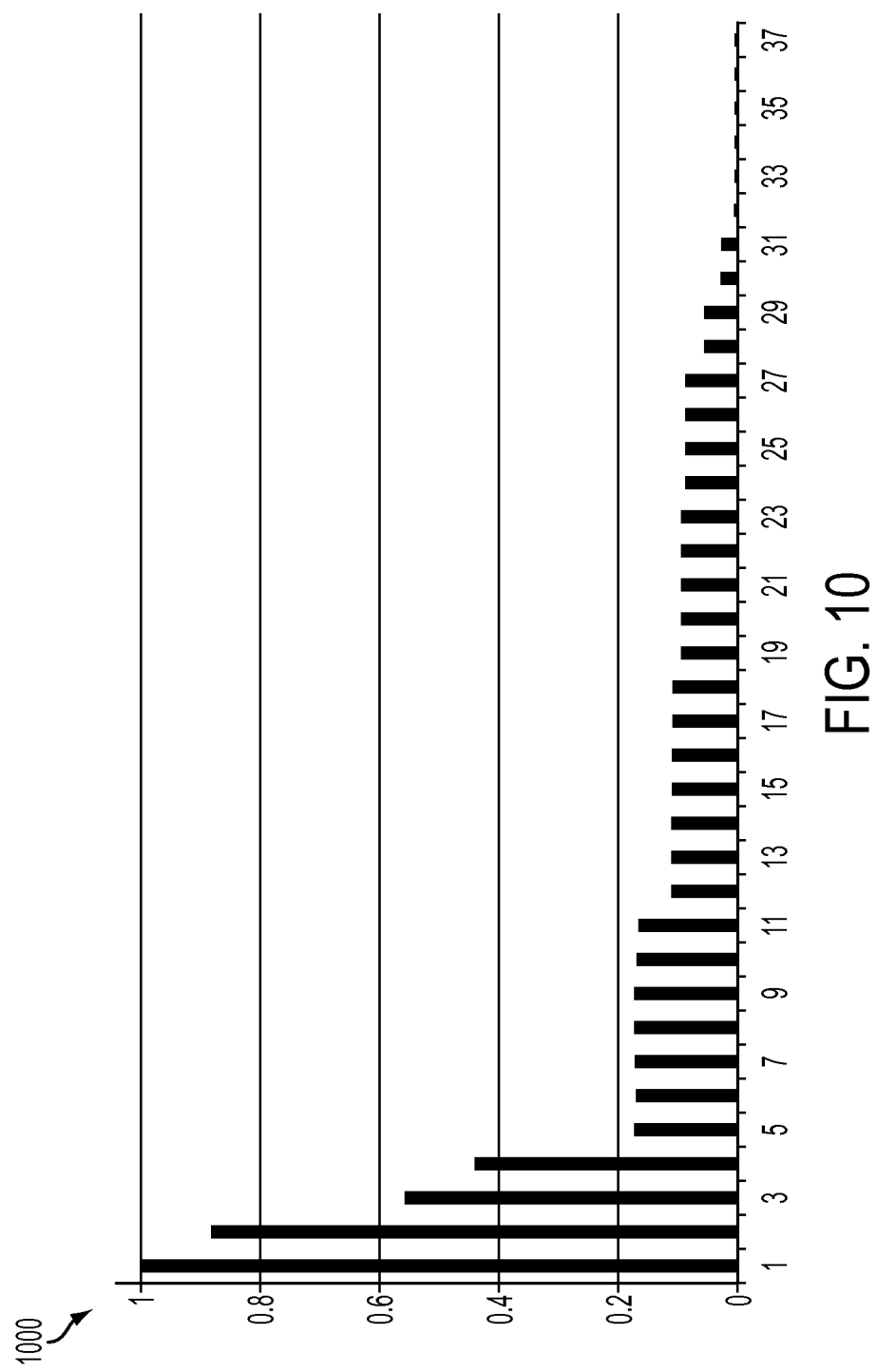
FIG. 10 is a pareto chart of individual component probabilities for 74181 scenario 50 (probabilities sum to greater than 1 because there are 6 faults)

There are 37 components indicated in this ambiguity group. FIG. 10 shows a Pareto graph 1000 of the probabilities of the individual components. The shape of the graph is clearly tiered indicating groups of indistinguishably faulted components.

Strategy Per Phase

The DXC competition limited NGDE to a specific timeout per scenario (20 CPU seconds). In order to produce the best estimate given that limit, the NGDE and method was to have two resource limits: 75% of its allocated CPU time (i.e., 20 CPU seconds) and 1000 candidate diagnoses. This allowed 25% of remaining CPU time to construct an answer. Since candidates need to be returned via a communication channel of unknown speed, NGDE limited itself to returning only 1000 diagnoses. The different exit operations during the phases were as follows:
1. If no minc diagnosis has been found, it returns a single candidate which contains all the components which appear in any minimal conflict.
2. Collect the minc diagnoses. Halt at 1000 diagnoses or 75% CPU time.

These limitations of course can be changed depending upon the particular implementation. The algorithm for the NGDE system and method is an anytime algorithm which yields better $M_{utl}$ if it is given more CPU time or larger candidate count limits.

Experimental Results and Conclusions

Table 3 synopsizes the results of the DXC competition. Three metrics contribute to the total score for an diagnostic algorithm: utility ($M_{utl}$), CPU time ($M_{cpu}$) and peak memory usage ($M_{mem}$). NGDE ranked best on the utility metric. However, it scored poorly on the CPU time and memory metrics. NGDE is written in Allegro Common Lisp which has a large memory footprint and spends a significant time just to start up. However, in the combined metric, NGDE came out first.

TABLE 3

Competition Results

| circuit | $M_{utl}$ | Rank | $M_{cpu}$ [ms] | $M_{mem}$ [Kb] |
|---|---|---|---|---|
| 74182 | 0.4793 | 1 | 6335 | 11540 |
| 74L85 | 0.3098 | 1 | 6365 | 11784 |
| 74283 | 0.1553 | 2 | 6385 | 12231 |
| 74181 | 0.1931 | 1 | 6619 | 14625 |
| c432 | 0.2096 | 1 | 7520 | 17868 |
| c499 | 0.0699 | 1 | 20347 | 32649 |
| c880 | 0.0401 | 1 | 14682 | 30634 |
| c1355 | 0.0246 | 1 | 22550 | 37930 |
| c1908 | 0.0150 | 2 | 26171 | 39843 |
| c2670 | 0.1076 | 1 | 20537 | 61722 |
| c3540 | 0.0407 | 1 | 27022 | 82045 |
| c5315 | 0.0275 | 1 | 30926 | 93116 |
| c6288 | 0.0563 | 1 | 17483 | 102420 |
| c7552 | 0.0283 | 2 | 37989 | 125910 |

Configurations of the NGDE System

Figure 11:
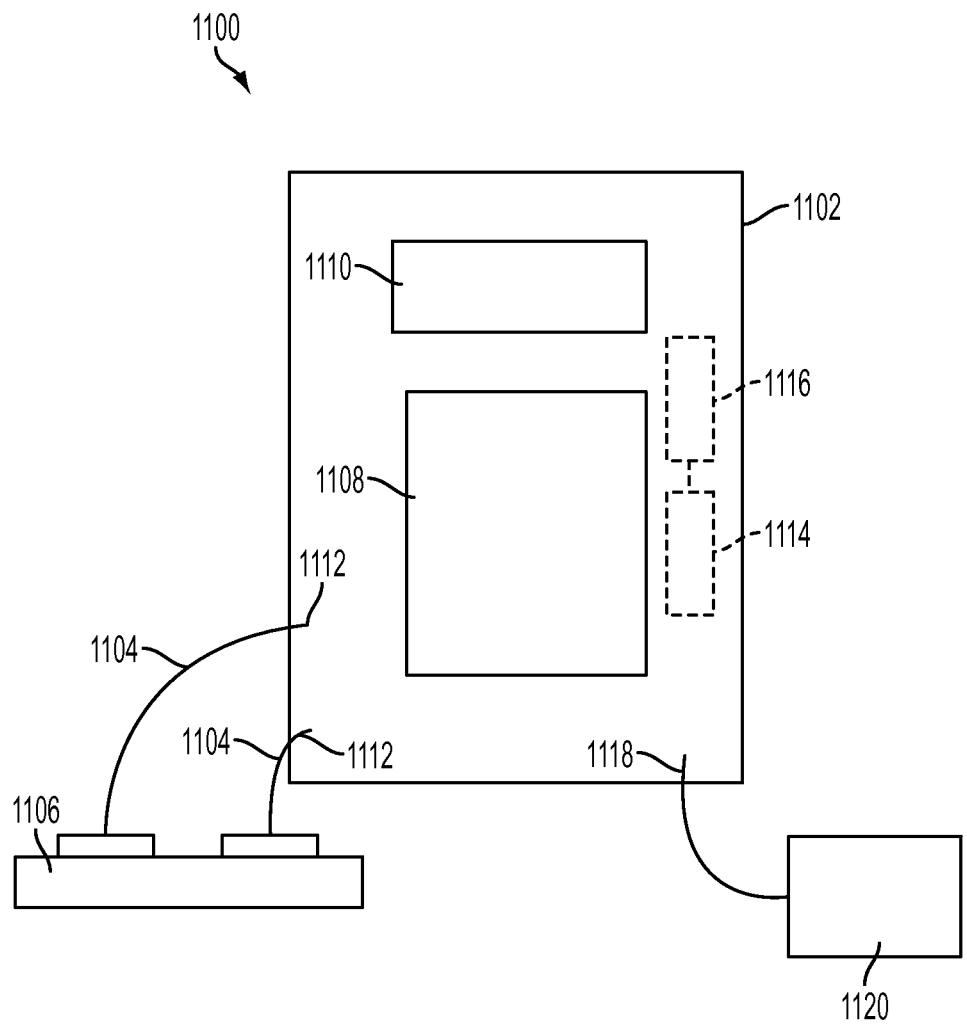
FIG. 11 is directed to one embodiment of a diagnostic device incorporating the concepts of the present application.

The preceding discussion focused on providing an improved system and method of diagnosing faults of a system under test. As previously mentioned, such diagnostic testing can be implemented in a wide range of areas. For example, as shown in FIG. 11, concepts disclosed in the present application may be embodied in a diagnostic device or system 1100, including a body 1102 and probes 1104. Probes 1104 are designed to be positioned in operative association with a device under test 1106. Body 1102 may include an input 1108 and an output 1110. The input 1108 can include an alphanumeric keypad, stylus, voice, or other input design or interface known to input data or instructions. Output 1110 may be any sort of display to display the results of a diagnostic investigation. Body 1102 may also include a secondary set of inputs 1112, wherein information detected by probes 1104 are automatically input into diagnostic device 1100.

It is to be understood that body 1102 includes computational capabilities including at least a processor 1114 and memory 1116, which permits the processing of software code, including code incorporating the concepts described herein. Still further, diagnostic device or system 1100 may include output 1118, for connection to an output device 1120 to permit the printing of hardcopies of output reports regarding the results of the diagnostic investigation.

It is to be appreciated the above description may be implemented on customized diagnostic devices, and/or may be included as part of hand-held computers, laptops, desktops or other computing devices, including personal digital assistants. Still further, the diagnostic device or system 1100 is intended only as examples of how the concepts of the present application may be implemented.

In another embodiment, of FIG. 11, the diagnostic device may not require probes 1104, but rather the diagnostics may be undertaken on computer software operating on the diagnostic device, or associated with another device having computational capabilities.

Figure 12:
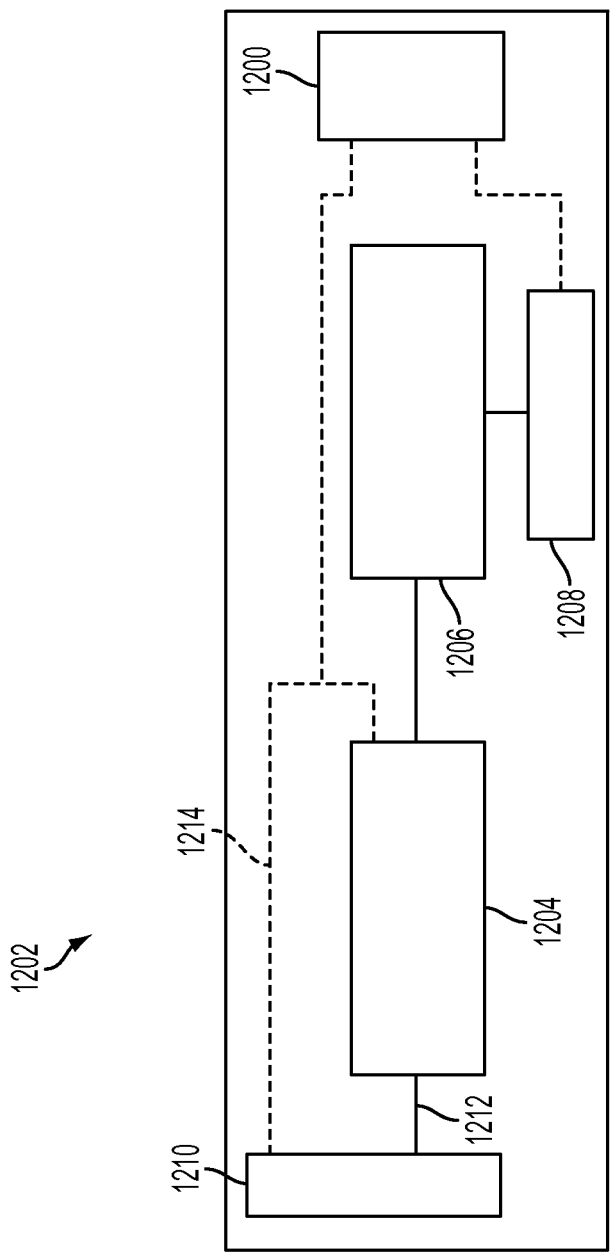
FIG. 12 is directed to an embodiment of an embedded diagnostic device.

In another embodiment illustrated in FIG. 12, the diagnostic device or system 1200 is itself embedded as part of a larger overall system 1202 which may, for example, include components 1204-1210 shown in operative connection with each other via solid lines 1212. The diagnostic device or system 1202, in turn is shown to be in operative connection with the components 1206-1210 via dotted lines 1214. It is to be appreciated FIG. 12 is a high level example of a system in which a diagnostic device or system according to the present application may be used. The purpose of the diagnostic device or system 1200 is to identify faults in the overall system 1202 and initiate repairs without any human intervention. Examples of such overall systems would be reprographic equipment, automobiles, spacecraft, and airplanes, among others.

This disclosure has shown that reducing the conflict set can enable efficient discovery of diagnoses which optimize utility for even very large systems. In practice, components may fail at varying rates. For this reason many candidate generators use best-first (highest posterior probability) search to identify better diagnoses first. The search in this disclosure can be expanded to address this challenge in two ways: (1) post-process the minc candidates as except in very rare cases, the most probable diagnoses are always among the minc candidates, (2) replace minc with posterior probability in the depth-first search.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method for performing diagnoses in a modeled system, the method comprising:
   searching for output information from components of the modeled system;

searching for conflicts among the output information of the modeled system being searched;

discovering conflicts among the output information;

forming a conflict set from the discovered conflicts;

transforming the conflict set into a simplified conflict set, the transforming including repeatedly:

(i) removing subsumed conflicts in the conflict set by subsumption;

(ii) factoring the set of conflicts into disconnected subgraphs;

(iii) further, removing a component x from all conflicts and note the equivalences if the component x≡a component y, wherein the component x≡the component y if conf(x)=conf(y), and wherein conf returns a set of conflicts in which a given component appears, and wherein the noted equivalences are not used to generate additional equivalent diagnoses; and (iv) further, removing the component x from all conflicts if the component x<the component y, wherein the component x<the component y if conf(x)∨ conf(y), searching for a diagnosis of the modeled system using the simplified conflict set;

obtaining the diagnosis using the simplified conflict set, wherein the obtaining focuses on obtaining a minimum cardinality diagnosis; and wherein the method is performed by at least one electronic processor and output to an output device for at least one of display and printing.

2. The method according to claim 1, wherein the searching for the minimum cardinality diagnosis includes using a depth-first search.

3. The method according to claim 2, wherein the minimum cardinality is bounded by (1) a number of outputs of the modeled system, (2) a number of minimal conflicts, and (3) a number of components involved in the minimal conflicts.

4. The method according to claim 1, wherein the searching for the minimum cardinality diagnosis includes (1) performing a connected component analysis to factor the conflicts and (2) reducing both the number of conflicts, their sizes and the involved variables, while preserving an ability to determine the minimum cardinality diagnoses.

5. The method according to claim 1, wherein there are up to 20 simultaneous component failures of the modeled system having greater than 1000 components.

6. The method according to claim 5, wherein for modeled systems where components fail at different rates, further comprising expanding the depth first search by post-processing the minimal cardinality (minc) candidates.

7. The method according to claim 6, further comprising expanding the depth first search by replacing the minimal cardinality (minc) with a posterior probability in the depth-first search.

8. The method according to claim 1, wherein any conflict that is subsumed by another conflict is removed from a conflict database by use of a Hybrid Truth Maintenance System (HTMS).

9. The method according to claim 1, wherein the focusing on obtaining the minimal cardinality includes use of a Hybrid Truth Maintenance System (HTMS).

10. The method according to claim 1, wherein when all appearances of a prediction x occur with a prediction y, then the prediction x is removed from all further predictions.

11. The method according to claim 10, wherein any prediction subsumed by another prediction is removed from a prediction database by use of a Hybrid Truth Maintenance System (HTMS).

12. The method according to claim 1, wherein as cardinality rises so does ambiguity group size.

13. The method according to claim 1, further including a conflict graph G, which is a bipartite graph (C∪A, E), where C is a set of conflicts, A is a set of propositional symbols, and an edge (c, α)∈E if literal α∈A occurs in clause c∈C.

14. The method according to claim 1, wherein a candidate generator includes a bounded depth first search, a connected component analysis and a conflict reduction process.

15. The method according to claim 1, wherein the forming includes adding the component x and the component y to the conflict set.

16. The method according to claim 1, wherein the subsumption includes: a) removing duplicate conflicts in the conflict set; and b) removing conflicts in the conflict set being a larger set of other conflicts in the conflict set.

17. The method according to claim 1, wherein obtaining the diagnosis reduces the search space when computing the minimum number of components that need replaced.

18. The method of claim 1, wherein there is at least one conflict set of components including at least: {A, B, C}, {A, B, R}, with A and B co-occurring in every conflict with every diagnosis containing A having a corresponding diagnosis with A replaced by B, such that these at least two conflicts are rewritten as two conflicts over one fewer variable: {A, C}, {A, R}, this conflict set having one minimum cardinality (minc) diagnosis [A], and another minc diagnosis for the original set being determined by replacing B for A in each diagnosis: [B];

this conflict set having the same minc value and thus eliminating variables, and wherein the depth-first search has been simplified and the upper bound of minc is reduced as the number of variables is an upper bound.

19. A method for performing diagnoses in a modeled system, the method comprising:

searching for output information from components of the modeled system;

searching for conflicts among the output information of the modeled system being searched;

discovering conflicts among the output information;

forming a conflict set from the discovered conflicts;

transforming the conflict set into a simplified conflict set, the transforming including repeatedly:

(i) removing subsumed conflicts in the conflict set by subsumption;

(ii) factoring the set of conflicts into disconnected subgraphs;

(iii) further, removing a component x from all conflicts and note the equivalences if the component x≡a component y, wherein the component x≡the component y if conf(x)=conf (y), and wherein conf returns a set of conflicts in which a given component appears and wherein the noted equivalences are not used to generate additional equivalent diagnoses; and (iv) further, removing the component x from all conflicts if the component x<the component y, wherein the component x<the component y if conf(x)∨ conf(y);

searching for a diagnosis of the modeled system using the simplified conflict set; and obtaining the diagnosis using the simplified conflict set, wherein the obtaining focuses on obtaining a minimum cardinality diagnosis and the simplified conflict set has the same minimum cardinality value as the conflict set formed from the discovered conflicts; and wherein the method is performed by at least one electronic processor and output to an output device for at least one of display and printing.

20. The method of claim 19, wherein there is at least one conflict set of components including at least: {A, B, C}, {A, B, R}, with A and B co-occurring in every conflict with every diagnosis containing A having a corresponding diagnosis with A replaced by B, such that these at least two conflicts are rewritten as two conflicts over one fewer variable: {A, C}, {A, R}, this conflict set having one minimum cardinality (minc) diagnosis [A], and another minc diagnosis for the original set being determined by replacing B for A in each diagnosis: [B];

this conflict set having the same minc value and thus eliminating variables, and wherein the depth-first search has been simplified and the upper bound of minc is reduced as the number of variables is an upper bound.

21. A diagnosis system configured to perform diagnoses in a modeled system, the diagnosis system comprising:

at least one processor configured to search for output information from components of the modeled system, for conflicts from among the output information of the modeled system, discover conflicts among the output information, and form a conflict set from the discovered conflicts;

the processor further configured to transform the conflict set into a simplified conflict set which actions include:
(i) reduce the sizes of conflicts in the conflict set, the reducing including removing a component x from all conflicts in the conflict set when all appearances of the component x occur with a component y; and
(ii) reduce the number of conflicts in the conflict set by subsumption;

the processor configured to transform further including being configured to repeatedly:
(i)' remove subsumed conflicts;
(ii)' factor the set of conflicts into disconnected subgraphs;
(iii)' if the component x≡the component y, remove the component x from all conflicts and note the equivalences wherein the noted equivalences are not used to generate additional equivalent diagnoses; and
(iv)' if the component x<the component y remove the component x from all conflicts;

a diagnostic device configured to search for and obtain a diagnosis using the simplified conflict set wherein the obtaining focuses on obtaining a minimum cardinality diagnosis; and an output device for at least one of display and printing.

22. The system according to claim 21, wherein the diagnostic device is configured to search for and obtain a diagnosis using the simplified conflict set reduces the search space when computing the minimum number of components that need replaced.

23. The system of claim 21, wherein there is at least one conflict set of components including at least: {A, B, C}, {A, B, R}, with A and B co-occurring in every conflict with every diagnosis containing A having a corresponding diagnosis with A replaced by B, such that these at least two conflicts are rewritten as two conflicts over one fewer variable: {A, C}, {A, R}, this conflict set having one minimum cardinality (minc) diagnosis [A], and another minc diagnosis for the original set being determined by replacing B for A in each diagnosis: [B];

this conflict set having the same minc value and thus eliminating variables, and wherein the depth-first search has been simplified and the upper bound of minc is reduced as the number of variables is an upper bound.

* * * * *